May 27, 1947. H. B. DAVIDSON 2,421,015
SALVAGE DEVICE
Filed Aug. 1, 1945
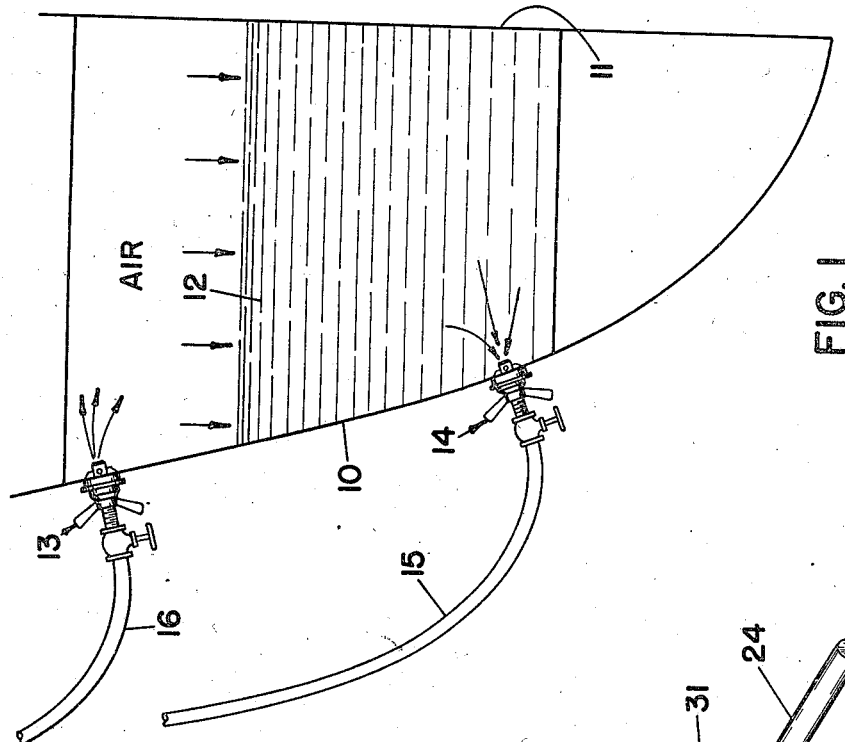
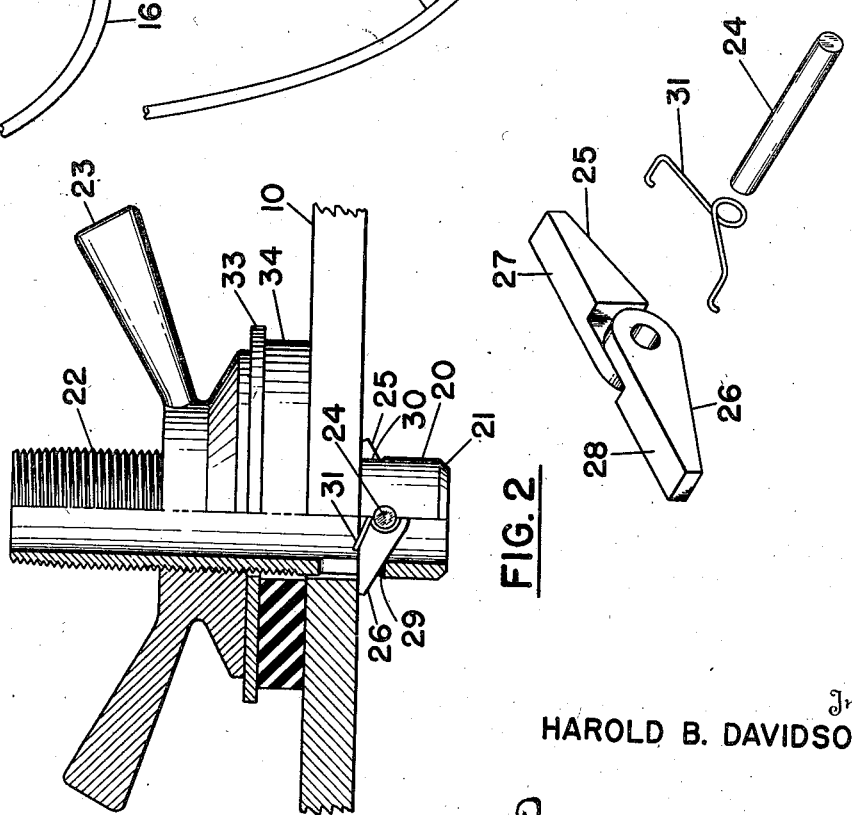
Inventor
HAROLD B. DAVIDSON Patented May 27, 1947

2,421,015

UNITED STATES PATENT OFFICE 2,421,015

SALVAGE DEVICE

Harold B. Davidson, United States Navy

Application August 1, 1945, Serial No. 608,329

1 Claim. (Cl. 285—44)

(Granted under the act of March 3, 1883, as amended April 30, 1928; 370 O. G. 757)

This invention relates to an improved salvage device to facilitate and reduce the time of insertion of an air or liquid connection through a ship's plate or the like.

More particularly, this invention is directed to a partially threaded tube with a locking lug assembly on the unthreaded end and a large winged nut in cooperation with a metal washer and a thick soft rubber sealing gasket on the threaded end. The device may be made in various sizes to fit a hole in a ship's plate such as can be made by a conventional velocity gun.

These improvements may be used above or below water or above and below water for such purposes as raising a ship on air, blowing compartments free of water and for the salvage of oil or other liquid by air. The invention is easily operable by hand and will reduce a diver's work time to a small fraction of the time required by present methods.

A valve, threaded or otherwise connected to the body of the connection is preferably used for oil or other liquid salvage work so that the flow of salvaged material may be brought under the immediate control of the operator.

The device may be recovered for re-use as will be more fully described herein.

An object of this invention is to provide an improved salvage connection with associated automatically actuated retaining means and manually controlled clamping means.

Another object is to provide a quickly insertable valve or hose connection for ships' plates.

Another object is to provide a valve connecting device for liquid salvage operations which will reduce the loss of the salvaged material to a minimum.

Another object is to provide a readily insertable connection for controlling air or water in salvage operations.

These and other objects of invention will be manifest from a consideration of the description, claims and drawings in which:

Fig. 1 is an elevational view of these improvements as used for the salvage of the contents of a ship's compartment.

Fig. 2 is a detail view, partly in section, showing the improved connection in position, and Fig. 3 is an exploded detail view of the locking lug assembly.

Referring to Fig. 1 there is shown a ship's hull plate 10 with compartment 11 and salvageable liquid such as oil 12. The improved connection and valve assembly are generally depicted at 13 and 14 and connected to the salvage hose 15 and air hose 16.

As will be understood, a diver or other operator can perforate the ship's plate 10 as by a velocity gun, not shown, and immediately insert the improved connection. An open and cylindrical member 20, preferably beveled as at 21 constitutes the main body portion. This cylindrical member or pipe is threaded with standard pipe threads at 22 to receive wing nut 23 and a hose or valve at its end. The beveled end is the inserting end and near this end the pipe has two diametrically opposed holes for the insertion of retaining pin 24, the ends of which are flush with or below the exterior surface of the pipe. A pair of locking lugs (Fig. 3) 25, 26 are mounted in position on the retaining pin 24 so that their flat sides 27 and 28 are extended through slots 29 and 30 by pressure of the spring 31. This construction permits insertion of the lugs through the plate opening and prevents withdrawal of the connection. The lugs 25, 26 are stopped by the end of the slots 29 and 30.

The clamping and exterior water seal construction comprises a wing nut 23 which may be turned by hand to draw up metal washer 33 and the soft rubber gasket 34. The gasket produces a good water seal without requiring excessive pressure being applied to the wing nut with resulting damage to the device.

As previously indicated, a valve or hose connection may be applied to the threaded end. A valve is usually required for underwater work as it may be used to retain the material to be salvaged or to protect it from sea water when a hose coupling is to be detached.

Fig. 1 illustrates a use of the invention both above and below the surface of the water. Air may be injected into the upper compartment 11 to create a pressure head effective to force material out through the lower connection.

When an operation has been completed, the device may be recovered intact by a U-shaped tool made of spring wire or a flat spring with hooked ends for engaging lugs 25 and 26 to lift them to retractable position. For quick removal where time is important, the entire lug assembly may be knocked out with a rod.

The invention herein described and claimed may be manufactured and used by or for the Government of the United States of America for governmental purposes without the payment of any royalties thereon or therefor.

Having described my invention in a preferred embodiment, I wish to be limited only by the scope of the attached claims.

I claim:

Means for connecting a pipe through a plate comprising a pipe end adapted to extend through an opening in the plate, said pipe end being provided with diametrically opposed elongated apertures and a second pair of apertures, substantially ninety degrees from said first pair, and inwardly of the elongated apertures toward the end of the pipe, a hinge pin supported in said second pair of apertures, lugs pivoted on said hinge pin and having their ends movable into said elongated apertures, a spring coiled about said hinge pin and having extending arms urging said lugs into expanded position against the end walls of said elongated apertures, said pipe end being threaded beyond all said apertures, a winged nut threaded thereon, and sealing washer means between said nut and the outer side of said plate, whereby tightening of said nut is effective to draw the ends of said lugs into binding engagement with the inner side of said plate and to provide a sealed connection between said pipe and said plate.

HAROLD B. DAVIDSON.

REFERENCES CITED

The following references are of record in the file of this patent:

UNITED STATES PATENTS

| Number | Name | Date |
|---|---|---|
| 672,154 | Taylor | Apr. 16, 1901 |
| 998,352 | Gublin | July 18, 1911 |